United States Patent
Whiteley

[11] 3,922,574
[45] Nov. 25, 1975

[54] PERMANENT MAGNET HERMETIC SYNCHRONOUS MOTOR

[75] Inventor: Eric Whiteley, Peterborough, Canada

[73] Assignee: General Electric Company, Schenectady, N.Y.

[22] Filed: Mar. 10, 1975

[21] Appl. No.: 557,159

[30] Foreign Application Priority Data
Apr. 4, 1974 Canada .............................. 196824

[52] U.S. Cl. .................. 310/156; 310/89; 310/268
[51] Int. Cl.² ........................................ H02K 21/12
[58] Field of Search ......... 310/89, 156, 268, 43, 91, 310/162–165

[56] References Cited
UNITED STATES PATENTS

| | | | |
|---|---|---|---|
| 2,846,951 | 8/1958 | Metral et al. | 310/268 X |
| 3,128,404 | 4/1964 | Dechet | 310/156 X |
| 3,168,664 | 2/1965 | Bost | 310/156 X |
| 3,168,664 | 2/1965 | Bost | 310/268 X |
| 3,196,302 | 7/1965 | Dechet | 310/268 X |
| 3,215,876 | 11/1965 | Nichols et al. | 310/156 |
| 3,219,861 | 11/1965 | Burr | 310/156 X |
| 3,223,867 | 12/1965 | Shapiro | 310/268 X |
| 3,324,321 | 6/1967 | Kober | 310/268 X |
| 3,348,086 | 10/1967 | Monma | 310/268 |
| 3,428,840 | 2/1969 | Kober | 310/268 X |
| 3,476,054 | 11/1969 | Gangloff | 310/268 X |
| 3,482,131 | 12/1969 | Lytle | 310/268 X |
| 3,678,314 | 7/1972 | Carter | 310/268 |
| 3,845,339 | 10/1974 | Merkle et al. | 310/156 |

*Primary Examiner*—Donovan F. Duggan
*Attorney, Agent, or Firm*—Vale P. Myles

[57] ABSTRACT

An axial gap synchronous motor consists essentially of a hermetic enclosure, a disc-shaped permanent magnet rotor supported inside the enclosure for rotation, a discoidal AC winding and a magnetic core located outside the enclosure. A plurality of axially oriented permanent magnet pole bodies on the rotor have pole faces lying in an annular surface spaced axially from a corresponding inner surface on a wall of the enclosure. The winding consists of a plurality of coils laid overlapping in an annular array and bonded together with a resinous material into a unitary structure having an annular disc portion containing the coil dises and inner and outer ring portions containing the coil endheads. It is supported with its disc portion adjacent the outer surface of the wall, and the core is supported adjacent the winding disc portion so that the winding disc portion is located between the wall and the core.

8 Claims, 5 Drawing Figures

PERMANENT MAGNET HERMETIC SYNCHRONOUS MOTOR

BACKGROUND OF THE INVENTION

This invention relates to a permanent magnet synchronous motor having a disc-type permanent magnet rotor located inside a hermetic enclosure and having a discoidal AC winding and a magnetic circuit located outside the enclosure.

SUMMARY OF THE INVENTION

According to the invention, an axial gap synchronous motor consists essentially of a hermetic enclosure, a disc-shaped permanent magnet rotor supported inside the enclosure for rotation, a discoidal AC winding and magnetic circuit means located outside the enclosure. A plurality of axially oriented permanent magnet pole bodies on the rotor have pole faces lying in an annular surface spaced axially from a corresponding inner surface on a wall portion of the enclosure. The winding consists of a plurality of coils laid overlapping in an annular array and bonded together with a resinous material into a unitary structure having an annular disc portion containing the coil sides and inner and outer ring portions containing the coil end-heads. The winding structure is supported with its disc portion adjacent the outer surface of the wall portion and the magnetic circuit means is supported adjacent the winding disc portion so that the winding disc portion is located between the wall portion and the magnetic circuit means. This magnetic circuit means and other magnetic circuit means on the rotor are linked magnetically with the pole bodies and provide flux paths for the pole bodies and the winding.

DESCRIPTION OF THE DRAWINGS

A number of embodiments of the invention will now be described in more detail with reference to the accompanying drawings, in which.

Figure 1:
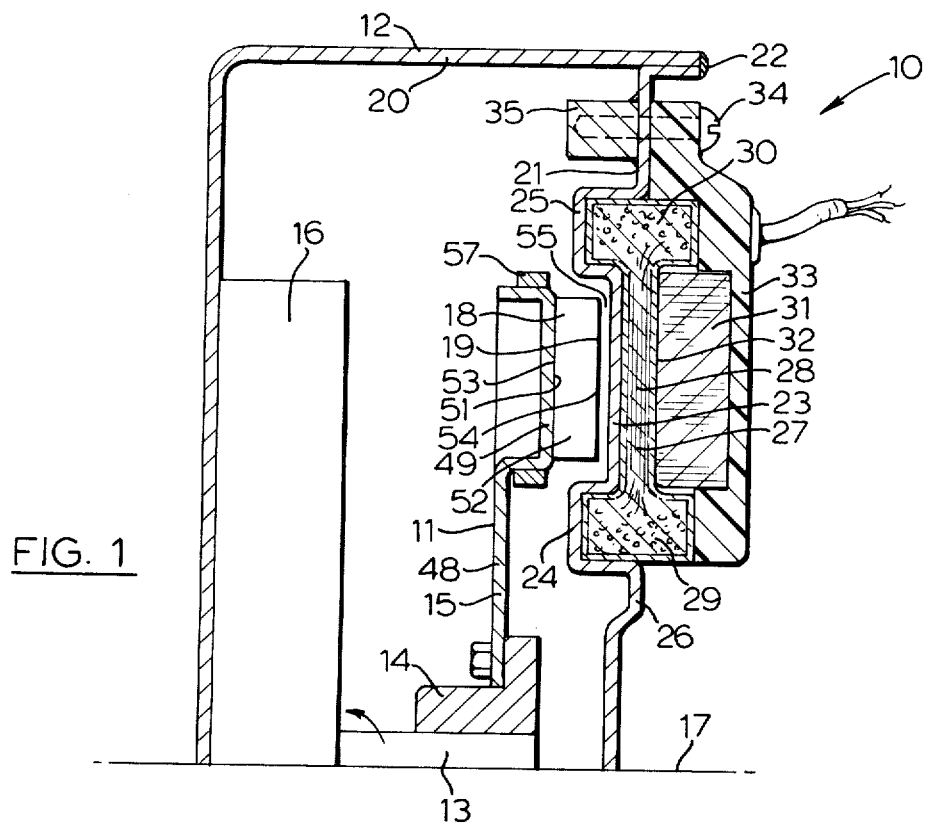
FIG. 1 is a view in section of a synchronous motor constructed according to the invention.

The synchronous motor 10 illustrated in FIG. 1 has a rotor 11 supported inside a hermetic enclosure 12 which is also the basic structure of the stator. The rotor consists essentially of a shaft 13, a hub 14 secured to the shaft and a disc-shaped member 15 secured to the hub. Rotor 11 has its shaft 13 coupled to a load 16 for driving it. This load is also located inside the hermetic enclosure 12; it and rotor 11 may be a compressor unit in a sealed refrigeration system. Rotor 11 is supported for rotation on axis 17, either on separate bearings or on an extension of the load shaft as shown in FIG. 1; in the latter case one set of bearings support the primary rotor of the load as well as the rotor of the motor. Rotor member 15 is part of a permanent magent field structure which includes a number of pole structures 18 terminating in pole faces 19. These faces lie in an annular surface normal to axis 17 and coaxial therewith. The field structure will be described later in more detail.

Enclosure 12 consists of a dish-shaped housing member 20 having a closure wall 21 shown in FIG. 1 as a separate member welded to the housing member at 22. Wall 21 is relatively thin, preferably, made of a poor or non-magnetic material of a type in which eddy currents are not readily induced, such as a thin sheet of a stainless steel. It is formed with a flat annular portion 23 located directly opposite pole faces 19 spaced a short axial distance therefrom. Portion 23 is bounded by two annular portions 24 and 25 offset inwardly with respect to portion 23 and an annular portion 26 offset outwardly. All four of these portions are substantially coaxial with respect to axis 17. Portions 23, 24 and 25 define an annular recess in the wall for receiving an annular discoidal winding structure 27 and portion 26 places an annular kink in the wall which provides temperature compensation for wall portion 23, by maintaining wall portion 23 in place within limits during changes in temperature.

Structure 27 contains an alternating current winding which will be described later in connection with FIG. 2. This winding serves the same purpose and functions in the same way as the alternating current winding in a conventional synchronous motor. Winding structure 27 has an annular disc portion 28 and inner and outer ring portions 29 and 30 respectively, all of which are coaxial. The winding structure is located outside enclosure 12 in the recess defined in wall 21 by portions 23, 24 and 25 with its disc portion 28 close to wall portion 23 and its ring portions 29 and 30 close to wall portions 24 and 25 respectively. The recess locates the winding structure coaxially with axis 17.

An annular laminated magnetic core 31 is located outside enclosure 12 between winding ring portions 29 and 30 close to winding disc portion 28. This score may be a strip of magnetic steel of uniform width wound spirally into a compact coil of annular configuration. One edge of the strip forms a flat surface 32 which abuts the surface of winding disc portion 28.

The winding structure and core may be held assembled to wall 21 by means of the annular member 33 shown in FIG. 1, or the winding structure may be bonded to the wall and the core to the winding structure by means of an adhesive such as an epoxy resin that is a good conductor of heat. When member 33 is used, it will be made of a material, for example, plastic, in which eddy currents are not readily induced, and it may be secured to the wall by means of screw fasteners 34 and 35. In this latter case, a thin layer of a head conductive bedding compound may be applied between the wall and the winding structure to bring the two surfaces into intimate heat transfer relation. Certain silicone rubber compounds have suitable thermal and physical properties for this application. Providing a heat conducting medium between the winding structure and the wall implies transferring heat from the winding to a cooler environment inside the enclosure. If, however, the environment inside the enclosure is too hot for winding cooling, then the winding may have to be cooled by external means, and in some instances isolated thermally from the wall.

Figure 2:
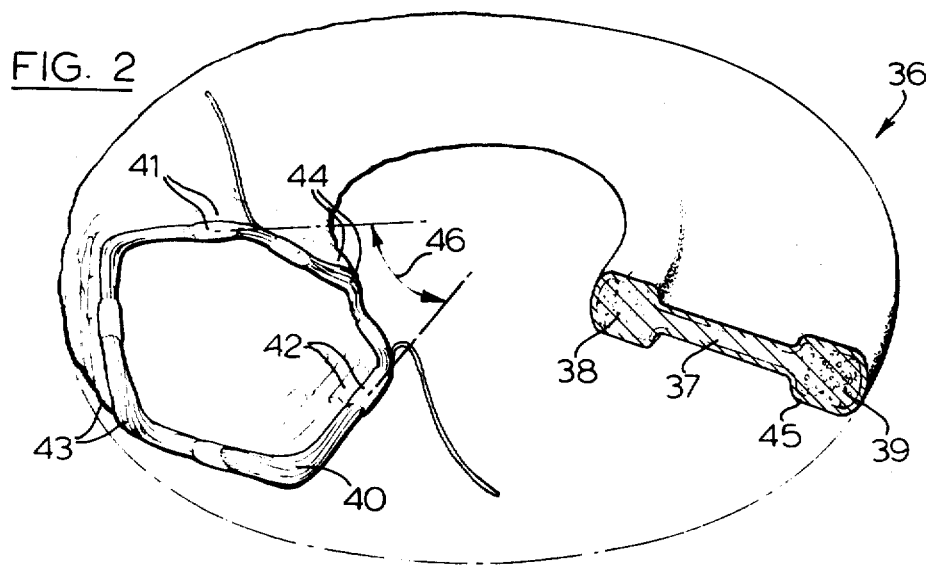
FIG. 2 is a view in perspective of a discoidal winding structure suitable for use in the machine of FIG. 1.
Figure 3:
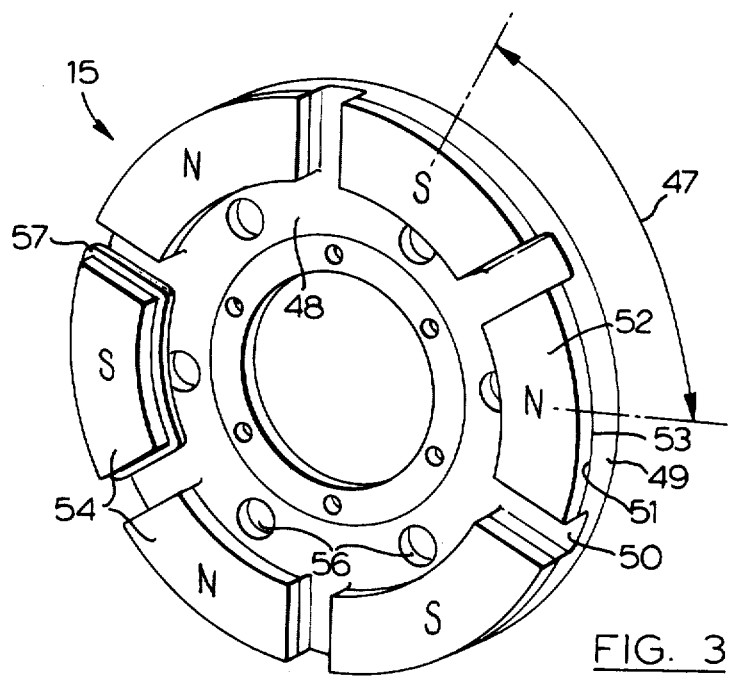
FIG. 3 is a view in perspective of a permanent magnet field structure suitable for use in the machine of FIG. 1.
Figure 4:
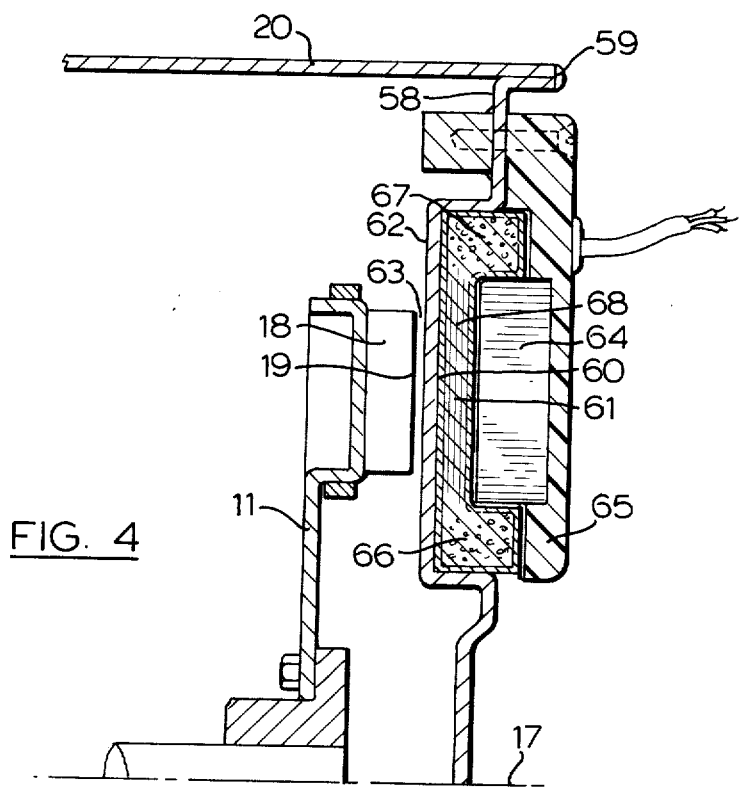
FIG. 4 is a view in section of a synchronous motor essentially the same as the motor shown in FIG. 1.

In FIG. 2 there is shown a discoidal winding structure 36 of a type suitable for use as the alternating current winding in the machine illustrated in FIG. 1 and readily adapted for use in the machine illustrated in FIG. 4. This particular winding structure has symmetrical ring portions 38 and 39 rather than the symmetrical ring portions shown in FIG. 4; otherwise the two are the same structurally and functionally. Winding structure 36 consists essentially of a plurality of multiple turn coils 40 laid in a flat circular array with the coil sides 41 overlapping sides 42 and the outer and inner end-heads 43 and 44 respectively nested together. The coils are identical, or as nearly identical as it is possible to make them, and their shape is such that they minimize copper and yet fit well together in a compact winding. The shape and lay of the coils as they appear during the winding operation is shown in FIG. 2. Once the coils are in place in the winding, the sides of the coils are pressed together to a specified coil side thickness and the entire winding is then encapsulated in a resinous material 45, such as an epoxy resin that will flow between the conductors. The resin may be reinforced with glass fibers in selected regions to improve the encapsulated structure. The resulting product is a discoidal winding structure of electrical conductors bonded together by means of a resinous material. This structure is rigid and strong enough that it requires little or no support from its mounting structure, preferably self-supporting under operating conditions. The resin bonded winding structure is in the configuration of an annular disc portion 37 located between enlarged inner and outer ring portions 38, 39 respectively, and the three portions are coaxial. Disc portion 37 is relatively thin and contains the sides 41, 42 of coils 40, the sides being radial and at a span 46 of approximately one pole pitch, pole pitch being the span between two adjacent poles of the machine as indicated at 47 in FIG. 3. Heads 43 on the diverging ends of the sides are located in the outer ring portion 39 and heads 44 on the converging ends of the sides are located in the inner ring portion 38. Winding structures of this nature are described in more detail in Canadian application, Ser. No. 188,535, filed Dec. 19, 1973, Eric Whiteley.

The disc-shaped member 15 of rotor 11 is made of a good magnetic material such as a mild steel. In FIGS. 1 and 3, it is shown as an annular member 48 formed with six portions 49 offset from the plane of the disc toward the winding structure. Portions 49 are spaced equally apart as indicated at 50 in FIG. 3, are spaced equally from axis 17, and have flat outer surfaces 51 lying in a plane normal to axis 17. The rotor is provided with a permanent magnet 52 for each portion 49. Each magnet is a relatively thin member having two flat and parallel surfaces 53 and 54, of which surface 53 abuts surface 51 and the other surface 54 forms the pole face, 19 referred to earlier. Pole faces 54 lie in a plane normal to axis 17, and are spaced axially from the inner surface of wall portion 23, leaving a narrow gap 55 between them and the wall. The magnets may be secured to the rotor structure by means of a film of an adhesive such as a film of an epoxy resin or by means of a low temperature brazing alloy between surface 51 and 53. As shown in FIG. 3, each magnet and its support appears face-on as a sector of an annulus.

For good machine performance, permanent magets 52 need be of a type capable of producing a strong magnetic field in a rather wide non-magnetic gap, that is, the gap from pole faces 54 to core surface 32 and including gap 55, wall portion 23, and winding disc portion 28, and resisting demagnetization by the alternating magnetic field in this gap from the AC winding. The cobalt-rare earth magnets meet this specification; certain ceramic magnets, such as ferrites, are also suitable for some applications. In very small machines, magnets 52 will probably be single permanent magnet units. However, in the larger machines, each one of the magnets 52 may be a mosaic of unit permanent magnets of the nature described and claimed in Canadian application, Ser. No. 181,935 filed Sept. 24, 1973, Eric Whiteley. Magnets 52 are magnetically oriented in a direction substantially parallel to axis 17 and have their pole faces 54 of alternate north and south polarities as indicated in FIG. 3. They may be mounted directly on a flat disc, or if thin as indicated in FIG. 3, on spacers such as the offset portions 49. Because the cobalt-rare earth compounds are expensive, the amount of the material used in a magnet is minimized by making the magnet as thin as possible. Portions 49 and the magnets thereon also act as an impeller for driving a cooling medium radially outward between the winding and the rotor during machine operation, the medium returning along the other side of the rotor and through the holes 56 in rotor member 48.

In the machine described above, low reluctance flux paths for the permanent magnet poles are provided as follows: first flux paths are provided by the annular member 48 of the rotor; and second flux paths on the other side of the AC winding 27 are provided by the laminated core 31. The magnetic circuit also includes the high reluctance gap from pole faces 54 to core surface 32 wherein the permanent magnet flux is linked with the conductors of the winding. If the winding is now connected to a suitable alternating current source, it will produce a rotating magnetic field linked with the permanent magnet field, and as a result the machine will operate as a synchronous motor. The nature of the alternating current needed for synchronous motor operation is essentially the same as that needed for a conventional synchronous motor.

The machine of FIGS. 1 and 3 may also be provided with an amortisseur winding 57 as is common practice with synchronous machines, and it serves the same purpose in both instances. An amortisseur winding is a convenient means for bringing the motor up to synchronous speed, that is, it causes the motor to start in the manner of an induction motor. Annular member 48 functions to some extent as an amortisseur winding for starting purposes, and it may be adequate for light load starting. However, heavy load starting will usually require more in the way of an amortisseur winding. The amortisseur winding illustrated in 57 in FIGS. 1 and 3 is in the form of a conductive collar surrounding each one of the offset portions on the rotor disc.

FIG. 4 shows another embodiment of the invention. This particular machine has the same rotor 11 as the machine of FIG. 1; it differs only in the structure of the wall and the winding. In FIG. 4, housing member 20 has a wall 58 secured to it at 59, and the wall is provided with an annular recess 60 for a discoidal winding structure 61. The recess has a flat bottom wall 62 spaced a short axial distance 63 from pole faces 19 and normal to axis 17. Winding structure 61 has a flat side located next to wall portion 62 and a recess in its other side containing a magnetic core 64. A clamping member 65 holds the winding structure in the recess in the wall and the core in the recess in the winding. As clearly shown in FIG. 4, winding structure 61 has its ring portions 66 and 67 fully offset to the right of its disc portion 68; otherwise it is the same structurally and functionally as the winding structure shown in FIG. 1. An asymmetrical winding structure of the type shown in FIG. 4 is described in more detail in the aforementioned Canadian patent application, Ser. No. 188,535.

Figure 5:
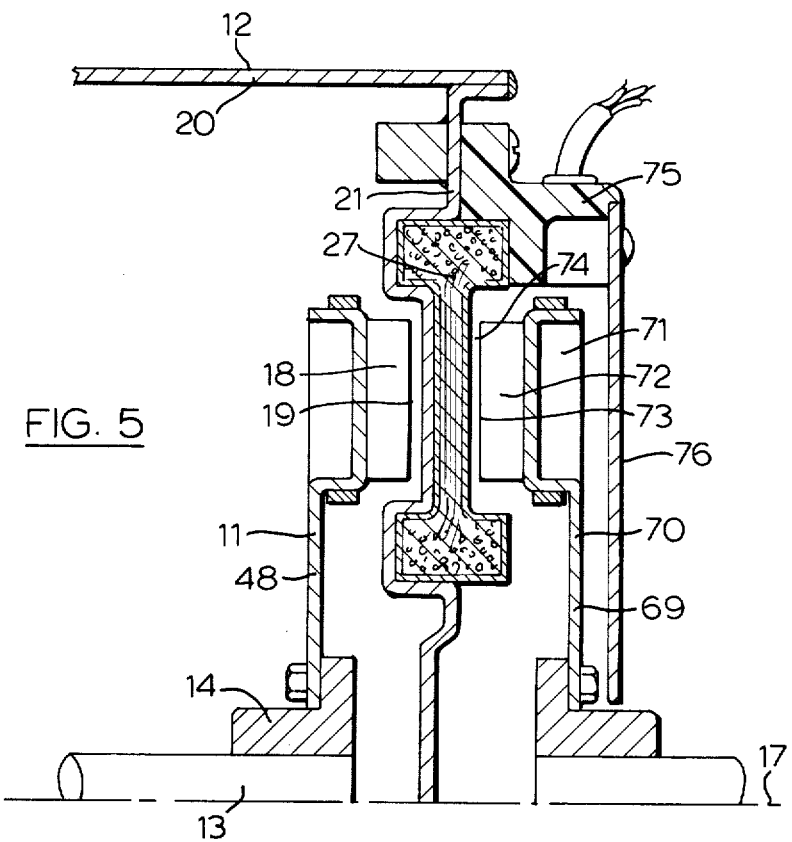
FIG. 5 is a view in section of another synchronous motor constructed according to the invention.

FIG. 5 shows another version of the type of synchronous motor shown in FIG. 1. This machine has the same type of rotor 11, hermetic enclosure 12, wall 21 and winding 27; it differs in that another rotor 69 is provided in place of the magnetic core 31. This other rotor 69 is located outside enclosure 12 and supported independently of rotor 11 for rotation on the same axis 17. It is provided with an annular member 70 having a plurality of pole structures 71 thereon disposed axially opposite the pole structures 18. There is one pole structure 71 for each pole structure 18, and they are essentially the same. Each pole structure 71 includes a permanent magnet 72, or a mosaic of unit permanent magnets, presenting a flat pole face 73 spaced axially from the winding disc portion a short distance 74. The polarities of pole structure 18 and 71 are such that they complement each other in providing magnetic flux in the non-magnetic gaps between their pole faces 19 and 73, and the annular members 48 and 70 complete the magnetic paths because they are made of a magnetic material such as mild steel.

Winding structure 27 is essentially the structure shown in FIG. 3; it may be supported on wall 21 through a bonding medium in combination with a clamping member 75, which member also provides support for a guard plate 76.

In the case of the FIG. 1 machine, member 48 is one magnetic means linked magnetically with the pole bodies and core 31 is another, whereby flux paths are provided for the permanent magnets and the winding. In the case of the FIG. 5 machine, core 31 is replaced by another member 70 which is like member 48 and which now serves as the other flux path means as well as adding to the permanent magnet field.

The motors shown in FIGS. 1, 4 and 5 are of a type well suited for separating the rotor from the rest of the motor by means of a wall, such as the wall 21 in FIGS. 1 and 5 and the wall 58 in FIG. 4. Preferably, this wall is just thick enough to withstand the mechanical and pressure differential loads imposed on it. The thinner the wall the less it adds to the width of the non-magnetic gap between the permanent magnet pole faces and the core. Since the non-magnetic gap in this type of motor is relatively wide without the wall, the small increase in gap width due to the wall will not have an appreciable effect on motor operation. The wall is made of a material which is strong mechanically and capable of maintaining a hermetic seal over a long period of time. Preferably, the material has poor magnetic properties or is non-magnetic, and it should be one in which eddy currents are not readily induced by the alternating flux from the winding next to the wall. Suitable materials for the wall are the stainless steels now used in conventional "canned" motors, or non-metallic materials such as glass fiber reinforced resinous materials.

When this type of motor is used to drive a compressor in a hermetic unit for a refrigeration system the material from which the wall is made is a reasonably good conductor of heat. Good motor cooling is to be expected when a large winding surface is in good heat transfer relation with the wall and the rotor circulates refrigerant over the inner surface of the wall. In this type of compressor unit all the moving parts are inside the enclosure and all the electrical conductors and insulation are outside the enclosure; no conductor seals are required as no conductors enter the hermetic enclosure. Hence, the materials, such as electrical insulation, that are attacked chemically by the refrigerant are isolated from it. Moreover, the enclosure, wall and rotor can be readily made of chemically inert materials that are not attacked by the refrigerant.

Hermetic motors of the type described are also well suited for certain fluid pumping applications. In these applications, the pumping unit will be located inside the enclosure and coupled to the rotor. If the fluid is hot, as it may well be, the electrical winding will be isolated thermally from the wall and cooled by external means. The wall may also be a poor conductor of heat.

In FIG. 5, one rotor is shown inside the hermetic enclosure and the other outside the enclosure. This other rotor 69 could be placed inside a second hermetic enclosure which would include a wall such as wall 21 between it and the winding structure, thereby providing an enclosure for rotor 69 like the enclosure 12 provided for rotor 11. An example of an application for the machine shown in FIG. 5 is a hermetic refrigeration unit where the enclosed rotor drives a compressor and the external rotor drives an air circulating fan or blower. The torques required of the two rotors can be quite different in magnitude at their rated loads, this difference being obtained by making the strength of the permanent magnets different. Since the two rotors are locked together magnetically through their respective permanent magnet pole structures, they rotate as one, and this, of course, will be a synchronous speed.

The discoidal winding structure described has the surfaces of its disc portion in parallel planes. This is not necessary; one or both of these surfaces may be the surface of a shallow cone. Moreover, the disc portion of the winding structure need not be uniform in thickness; it may, for example, be thicker at the inner ring portion than at the outer ring portion. In these configurations, the permanent magnet pole faces will, of course, conform with the winding surface in a way that provides the desired flux distribution in the non-magnetic gap. As in the case of conventional synchronous machines, the number of poles used in a machine will depend upon the size and speed of the machine, which may be a number other than the six illustrated in FIG. 3.

What is claimed as new and desired to be secured by Letters Patent of the United States is:

1. An axial gap synchronous motor comprising a hermetic enclosure having a relatively thin annular wall portion of substantially uniform thickness; a disc-shaped permanent magnet rotor supported inside said enclosure for rotation on an axis coinciding with the axis of said annular wall portion, said rotor having first magnetic means linked magnetically with a plurality of permanent magnet pole bodies spaced apart in an annular array coaxial with respect to said axis of rotation, and said pole bodies being oriented magnetically in an axial direction and having alternate north and south polarity pole faces lying in an annular surface located near and conforming with the inner surface of said annular wall portion but spaced axially therefrom; an annular array of overlapping coils bonded together by means of a bonding medium to form a unitary discoidal winding structure having an annular disc portion containing the coil sides and inner and outer ring portions containing the coil end-heads, each one of said coils having its sides generally radial and at a coil span of approximately one pole pitch, and said coils being interconnected as an alternating current winding; means for supporting said winding structure outside said enclosure coaxial with respect to said axis of rotation and with one side of the winding disc portion adjacent the outer surface of said annular wall portion of the enclosure; and second magnetic means located on the other side of said winding disc portion and linked magnetically with the winding structure, said first and second magnetic means providing flux paths for the pole bodies and the winding.

2. The machine of claim 1 wherein said rotor is a disc-like member made of a magnetic material and said pole bodies are attached to the member, whereby the member provides the flux paths of said first magnetic means.

3. The machine of claim 2 wherein said second megnetic means comprises an annular core having a flat surface thereon abutting said other side of said winding disc portion; and means for securing said winding structure and said core to said enclosure.

4. The machine of claim 3 wherein said annular core comprises a strip of magnetic steel of uniform width wound into a compact spiral.

5. The machine of claim 2 wherein said second magnetic means comprises a disc-shaped rotor of magnetic material mounted for rotation on said common axis; another plurality of permanent magnet pole bodies on said disc-shaped rotor equal in number to the like said pole bodies, said other pole bodies having their faces located adjacent to said other side of said winding disc portion and axially opposite the respective pole faces lying in said annular surface, and said other pole bodies being axially oriented magnetically for aiding said pole bodies.

6. The machine of claim 1, wherein each one of said pole bodies comprises magnetic structure having a flat surface thereon; and a plurality of flat unit magnets placed edge-to-edge with one side thereof on said surface and bonded thereto, said unit magnets being of uniform thickness oriented in the same polarity sense, and having their other side form the pole face.

7. The machine of claim 1, wherein said annular wall portion is a thin sheet of a material having poor magnetic properties and low eddy current losses.

8. The machine of claim 1, wwherein said annular wall portion is a thin sheet of a stainless steel.

* * * * *